(12) United States Patent
Hsu (10) Patent No.: US 11,300,466 B1
(45) Date of Patent: Apr. 12, 2022

(54) PRESSURE GAUGE WITH DUAL BOURDON TUBES

(71) Applicant: Chih-Hsiang Hsu, Taipei (TW)

(72) Inventor: Chih-Hsiang Hsu, Taipei (TW)

(73) Assignees: PORAUTO INDUSTRIAL CO., LTD., Taipei (TW); ACCUAIRE CORP., Taipei (TW)

( * ) Notice: Subject to any disclaimer, the term of this patent is extended or adjusted under 35 U.S.C. 154(b) by 21 days.

(21) Appl. No.: 17/103,860

(22) Filed: Nov. 24, 2020

(51) Int. Cl.
  *G01L 7/04* (2006.01)
  *G01L 19/06* (2006.01)

(52) U.S. Cl.
  CPC .............. *G01L 7/041* (2013.01); *G01L 7/043* (2013.01); *G01L 19/0618* (2013.01)

(58) Field of Classification Search
  CPC ... G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
  USPC .................................................. 73/700–756
  See application file for complete search history.

(56) References Cited

U.S. PATENT DOCUMENTS

| | | | | |
|---|---|---|---|---|
| 4,718,279 A | * | 1/1988 | Hestich | G01L 13/021 73/734 |
| 4,838,090 A | * | 6/1989 | Hestich | G01L 7/04 73/737 |
| 5,895,861 A | * | 4/1999 | Slonaker | G01L 19/16 73/732 |
| 2006/0096382 A1 | * | 5/2006 | Campbell | G01L 7/048 73/732 |
| 2013/0255564 A1 | * | 10/2013 | Swanson | G01L 7/045 116/303 |
| 2016/0377459 A1 | * | 12/2016 | Faeth | G01L 7/04 116/292 |

* cited by examiner

*Primary Examiner* — Andre J Allen (57) ABSTRACT

A pressure gauge includes a case with a dial, and a pressure detection unit is located in the case. The chassis plate including a first pivot unit, a second pivot unit, a first Bourdon Tube, a second Bourdon Tube, a first transmission unit, a second transmission unit and an entrance connected thereto. The first Bourdon Tube is connected to the first pivot unit by the first transmission unit, and the second Bourdon Tube is connected to the second pivot unit by the second transmission unit. The entrance communicates with the first and second Bourdon Tubes. The first and second pivot units extend through the dial so as to be connected with a first hand and a second hand respectively. The first and second hands respectively respond different pressure values for more accuracy.

8 Claims, 13 Drawing Sheets

PRESSURE GAUGE WITH DUAL BOURDON TUBES

BACKGROUND OF THE INVENTION

1. Fields of the Invention

The present invention relates to a pressure gauge, and more particularly, to a pressure gauge with dual hands to precisely disclose the measured pressure.

2. Descriptions of Related Art

The conventional pressure gauges are used to detect air pressure, liquid pressure, water pressure of appliances or piping systems so as to properly adjust the pressure to prevent the equipment from being damaged. The most commonly used pressure gauges use a Bourdon Tube which is designed to be deformed by the object to be detected so as to drive a hand of the pressure gauge to show the pressure on the dial of the pressure gauge.

Figure 13:
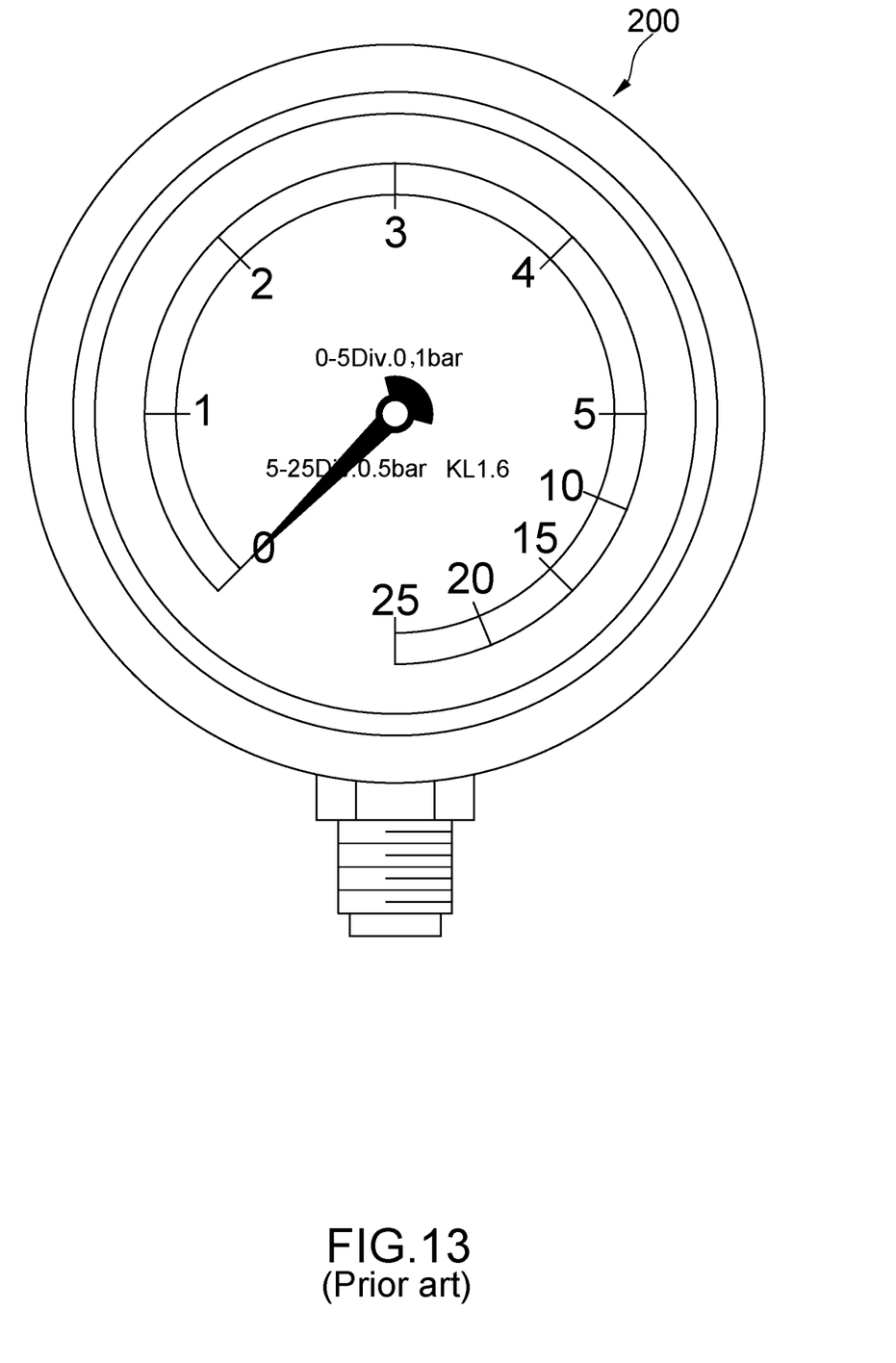
FIG. 13 shows a conventional pressure gauge.

However, as shown in FIG. 13, the conventional pressure gauge 200 includes a dial with multiple marks, wherein the distances between the marks at the front section (0 to 5 Bar) is different from those between the marks at the rear section (5 to 25 Bar). This is because the deformation of the Bourdon Tube is different so that the distances between the marks at the rear section is larger than those at the front section. The problems is that this includes a tolerance of 20% to 30% at the rear section, so that the conventional pressure gauge is not a precise measurement tool. Besides, the deformation of the Bourdon Tube becomes partially permanent deformation at high pressure so that the hand is difficult to return to the initial position, and this causes the pressure gauge no longer be precise. In some cases, exterior impact to the pressure gauge will cause the deformation, such as the pressure gauge is applied to agriculture machine.

The present invention intends to provide a pressure gauge to eliminate shortcomings mentioned above.

SUMMARY OF THE INVENTION

The present invention relates to a pressure gauge and comprises a case having a dial located therein. A room is formed between the case and the dial. A pressure detection unit is located in the room and includes a chassis plate. The chassis plate includes a first pivot unit, a second pivot unit, a first Bourdon Tube, a second Bourdon Tube, a first transmission unit, a second transmission unit and an entrance connected thereto. The first Bourdon Tube is connected to the first pivot unit by the first transmission unit. The second Bourdon Tube is connected to the second pivot unit by the second transmission unit. The entrance communicates with the first and second Bourdon Tubes. The first and second pivot units partially extend through the dial. A first hand is connected to the first pivot unit and located above the dial. A second hand is connected to the second pivot unit and located above the dial.

The primary object of the present invention is to provide a pressure gauge which includes two Bourdon Tubes, and two hands are respectively connected to the two Bourdon Tubes so as to respond to different pressures with high accuracy.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 6, the first embodiment of the pressure gauge of the present invention comprises a case 1 with a dial 2 located in the case 1. A room 100 is formed between the case 1 and the dial 2. A pressure detection unit 3 is located in the room 100 and includes a chassis plate 4. The chassis plate 4 includes a first pivot unit 5, a second pivot unit 6, a first Bourdon Tube 7, a second Bourdon Tube 8, a first transmission unit 9, a second transmission unit 10 and an entrance 20 connected thereto. The first Bourdon Tube 7 is connected to the first pivot unit 5 by the first transmission unit 9, and the second Bourdon Tube 8 is connected to the second pivot unit 6 by the second transmission unit 10. The entrance 20 is used to receive object or gas or liquid source to be detected. The entrance communicates with the first and second Bourdon Tubes 7, 8. The first and second pivot units 5, 6 partially extend through the dial 2. A first hand 50 is connected to the first pivot unit 5 and located above the dial 2, and a second hand 60 is connected to the second pivot unit 6 and located above the dial 2.

Figure 5:
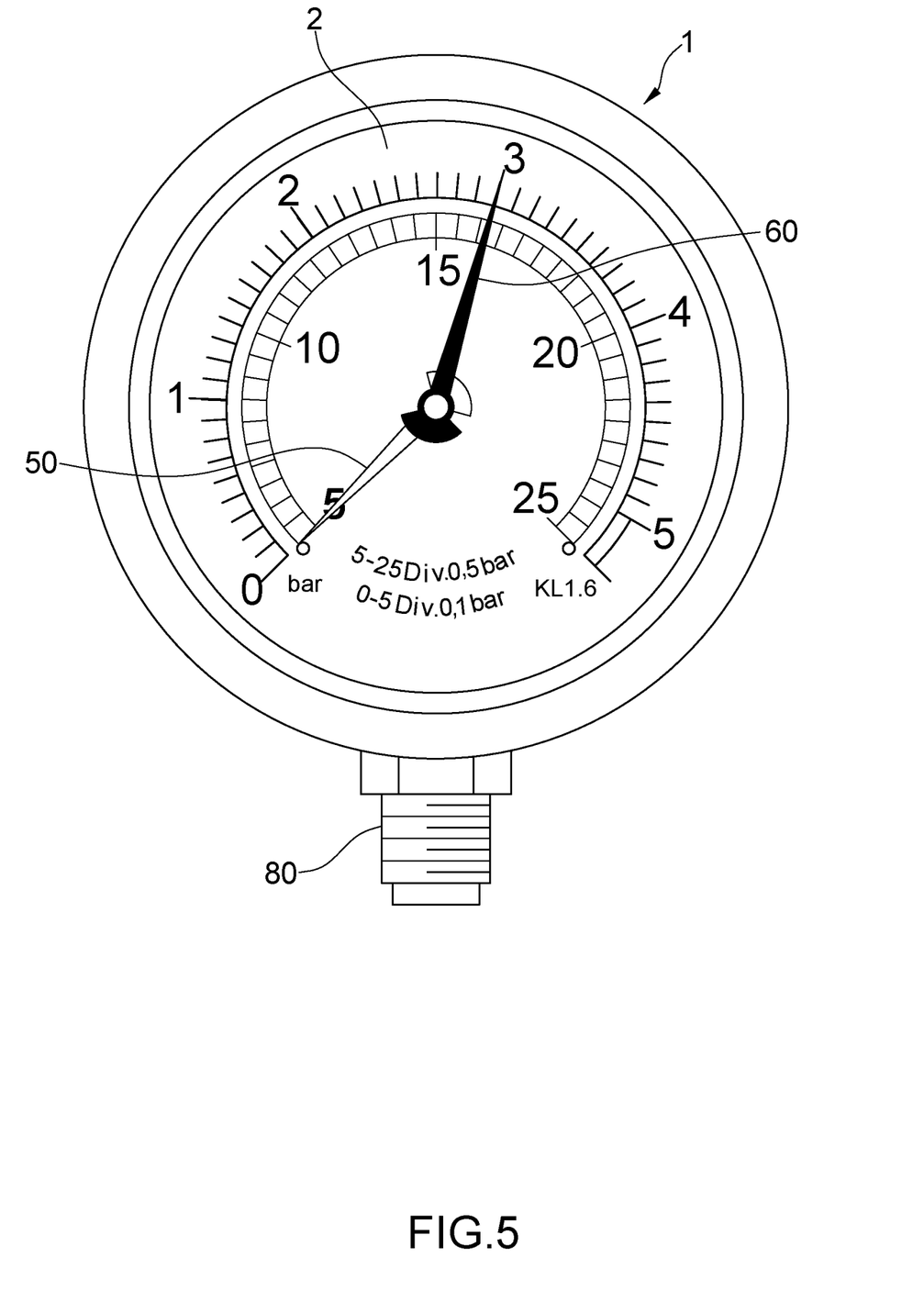
FIG. 5 shows that the second hand of the pressure gauge of the present invention is moved.
Figure 6:
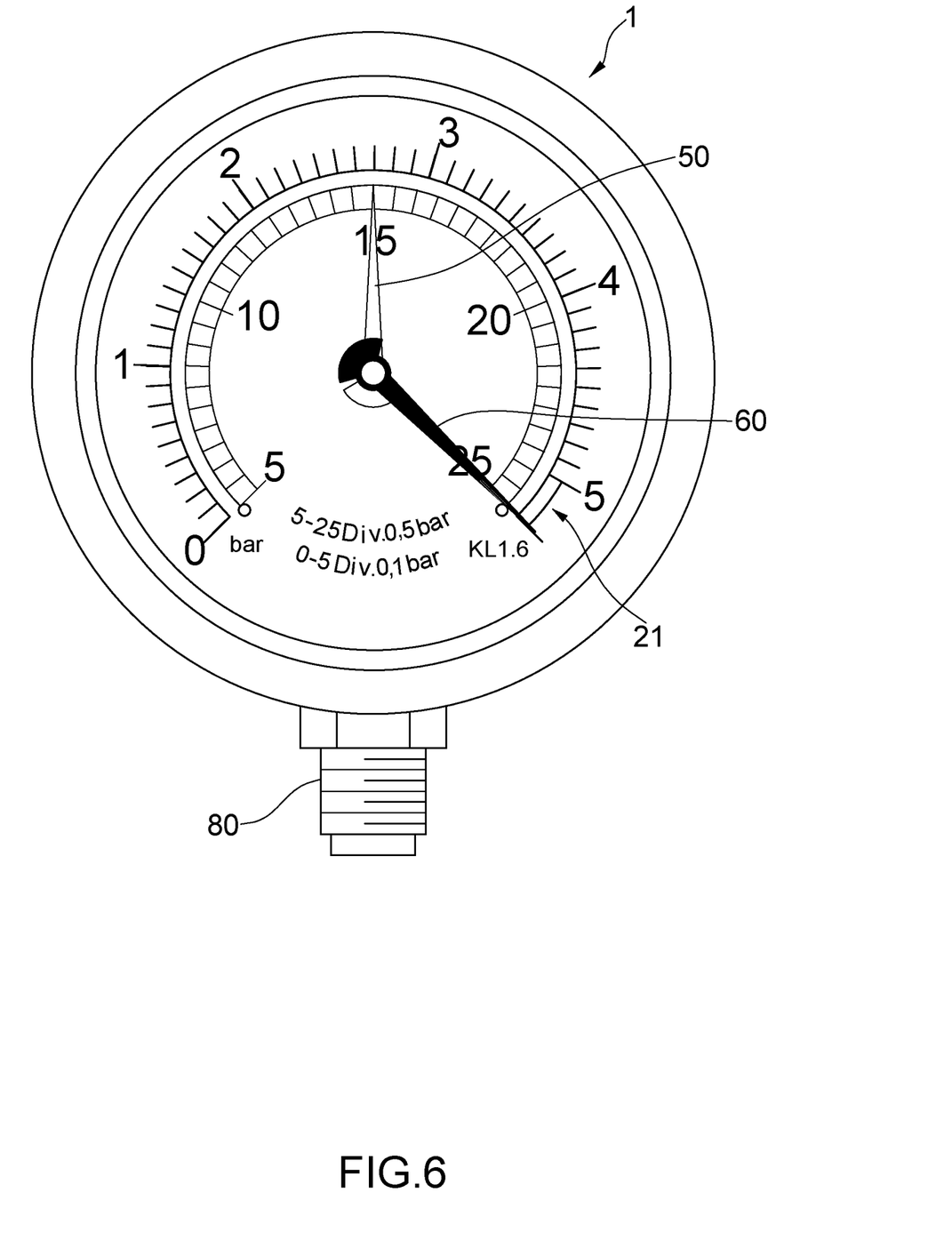
FIG. 6 shows that the first and second hands of the pressure gauge of the present invention are both moved.

The chassis plate 4 is connected to the case 1 by the entrance 20 and a connector 80. Assume that the pressure range of the first Bourdon Tube 7 is larger than that of the second Bourdon Tube 8. The first pivot unit controlled by the first Bourdon Tube 7 drives the first hand 50 to indicate the pressure value of the rear section, in this embodiment, the angle of 0 to 270 degrees that the second hand 50 rotates corresponds to 5 to 25 Bar. The second pivot unit 6 controlled by the second Bourdon Tube 8 drives the second hand 60 to indicate the pressure value of the front section, in this embodiment, the angle of 0 to 270 degrees that the second hand 50 rotates corresponds to 0 to 5 Bar. Compared to the conventional pressure gauge having only one hand, the accuracy is improved. As shown in FIG. 5, when the pressure of the object to he detected is 3 Bar, the second hand 60 points to the mark of 3 Bar. The pressure of 3 Bar cannot deform the first Bourdon Tube 7 significantly so that the first hand 50 does not rotate obviously. As shown in FIG. 6, when the pressure of the object to he detected is 15 Bar, the second hand 60 points to the warning zone 21 which means the pressure detected is higher than 5 Bar, and the first hand 50 points to the mark of 15 Bar.

The use of two hands and Bourdon Tubes provides more detailed values as disclosed in the previous embodiment, the first hand 50 rotates 0 to 270 degrees to correspond to 5 to 25 Bar. As shown in FIG. 13, the hand of the conventional pressure gauge 20 only can rotate 90 degrees to respond to the same pressure range. The present invention is more detailed and accurate.

Figure 1:
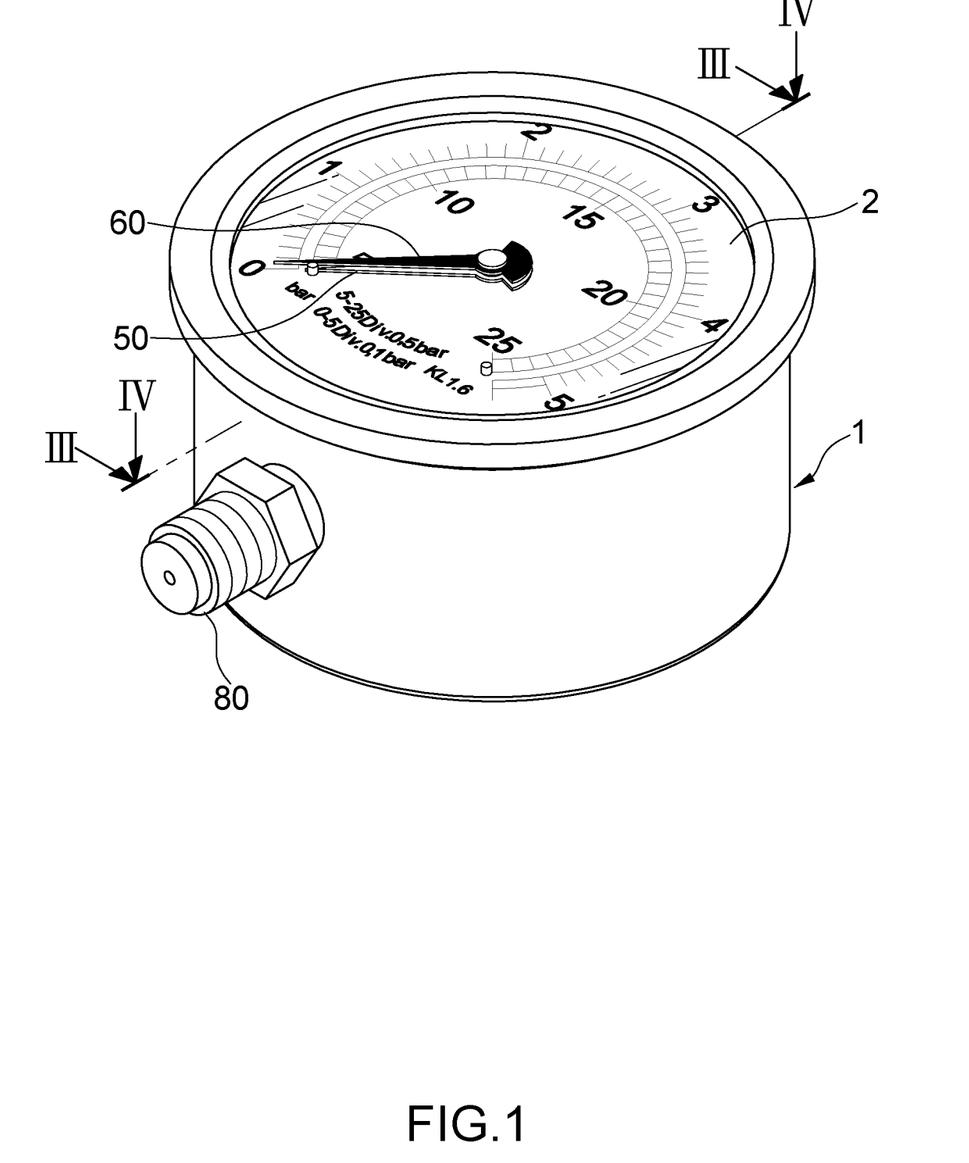
FIG. 1 is a perspective view to show the pressure gauge of the present invention.
Figure 2:
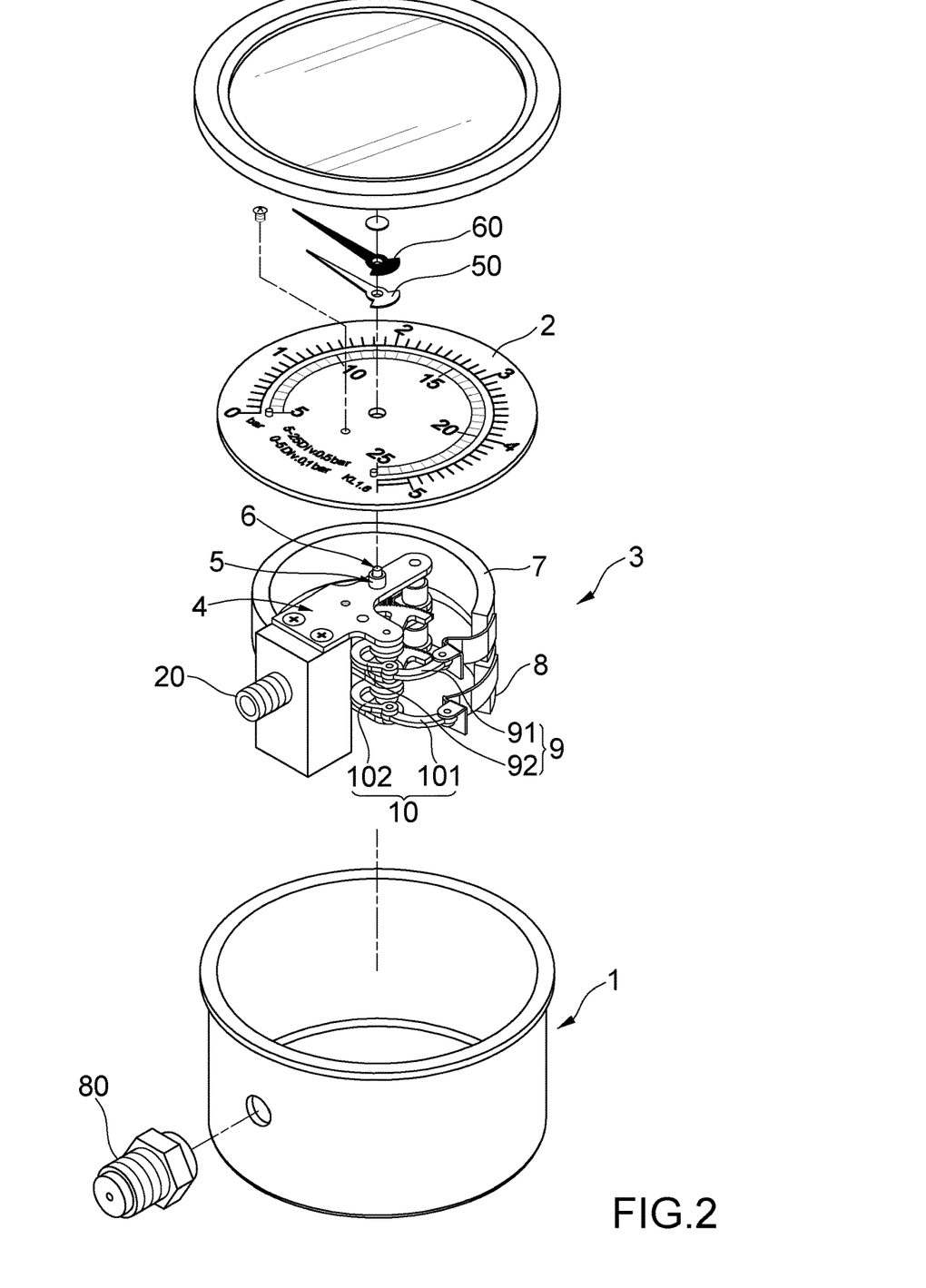
FIG. 2 is an exploded view of the pressure gauge of the present invention.
Figure 3:
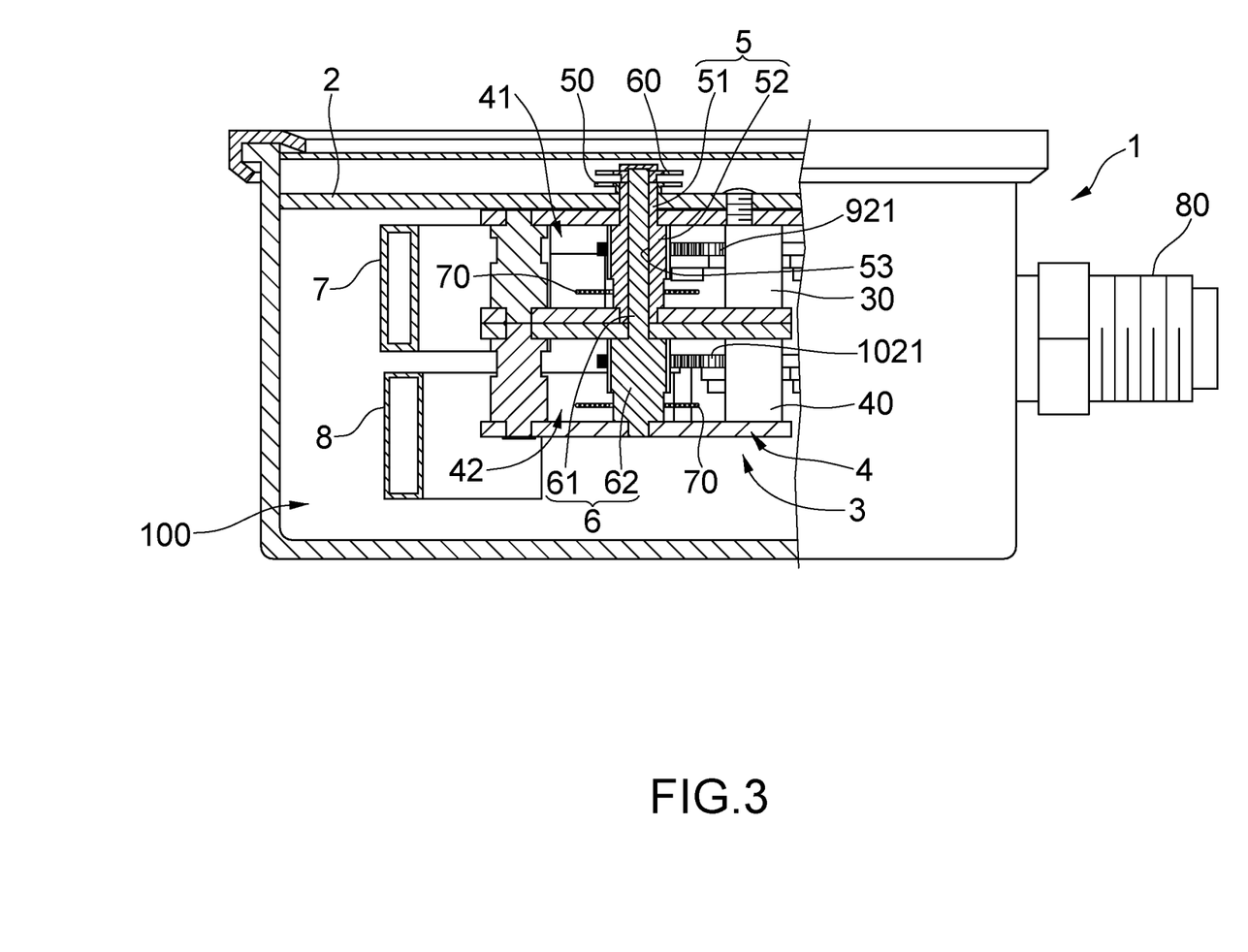
FIG. 3 is a cross sectional view, taken along line III-III in FIG. 1.
Figure 4:
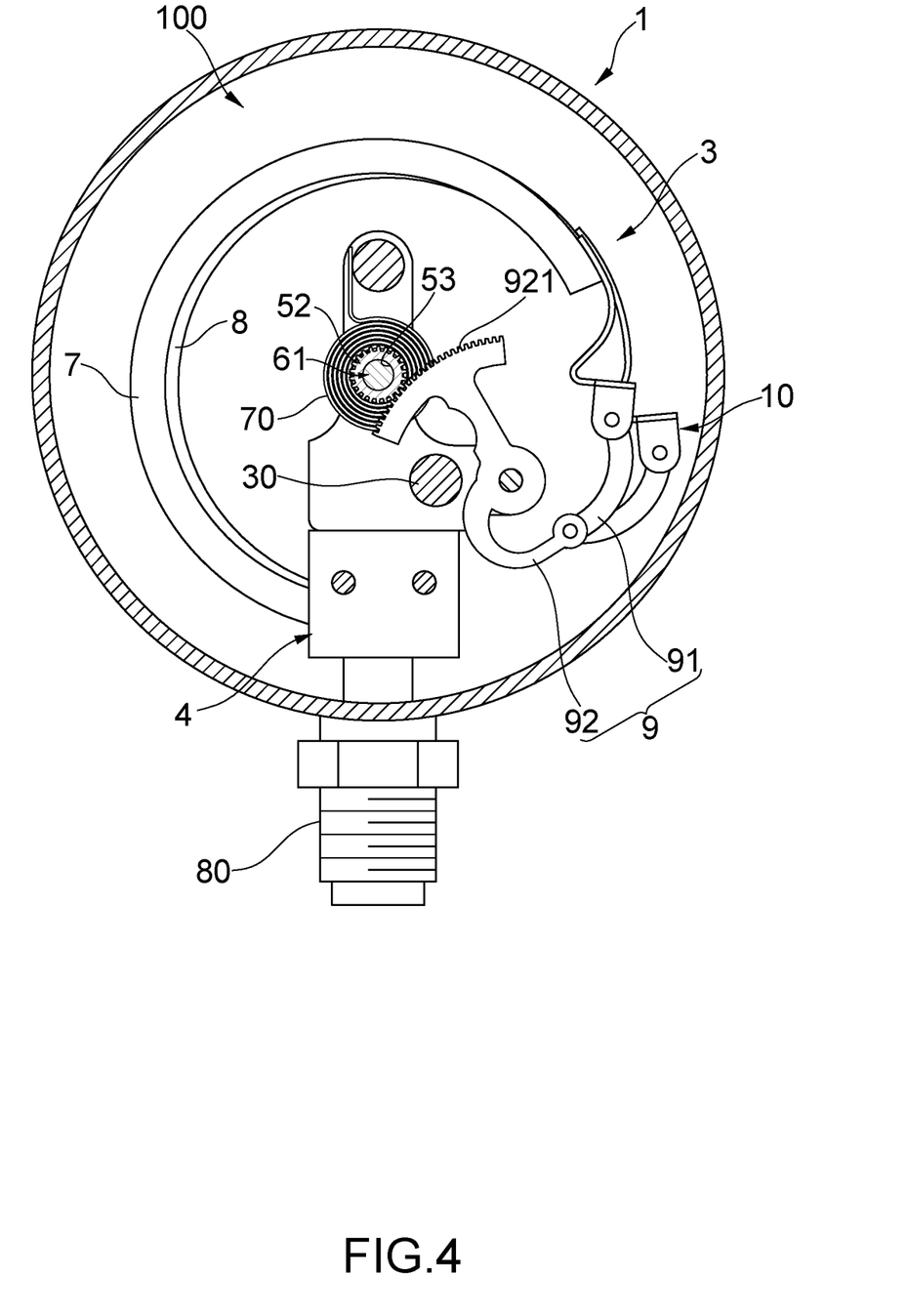
FIG. 4 is a cross sectional view, taken along line IV-IV in FIG. 1.

As shown in FIGS. 2 to 4, the chassis plate 4 includes a first space 41 and a second space 42 which is separated from the first space 41. The first pivot unit 5 includes a first pivot 51 and a first gear 52 which is formed with the first pivot 51. The first gear 52 is located in the first space 41. A passage 53 is defined through the first pivot 51 and the first gear 52. The second pivot unit 6 includes a second pivot 61 and a second gear 62 which is formed with the second pivot 61. The second gear 62 is located in the second space 43. The second pivot 61 extends through the passage 53 and the first pivot unit 51. The first pivot 51 and the second pivot 61 partially extend through the dial 2 and are exposed beyond the dial 2. The first transmission unit 9 is threadedly engaged with the first gear 52, and the second transmission unit 10 is threadedly engaged with the second gear 6. The first and second pivot units 5 and 6 share a common axis to save the space that the chassis plate 4 occupies. That is to say, the first and second hands 50, 60 rotate about a common axis to minimize the size of the dial 2.

Figure 7:
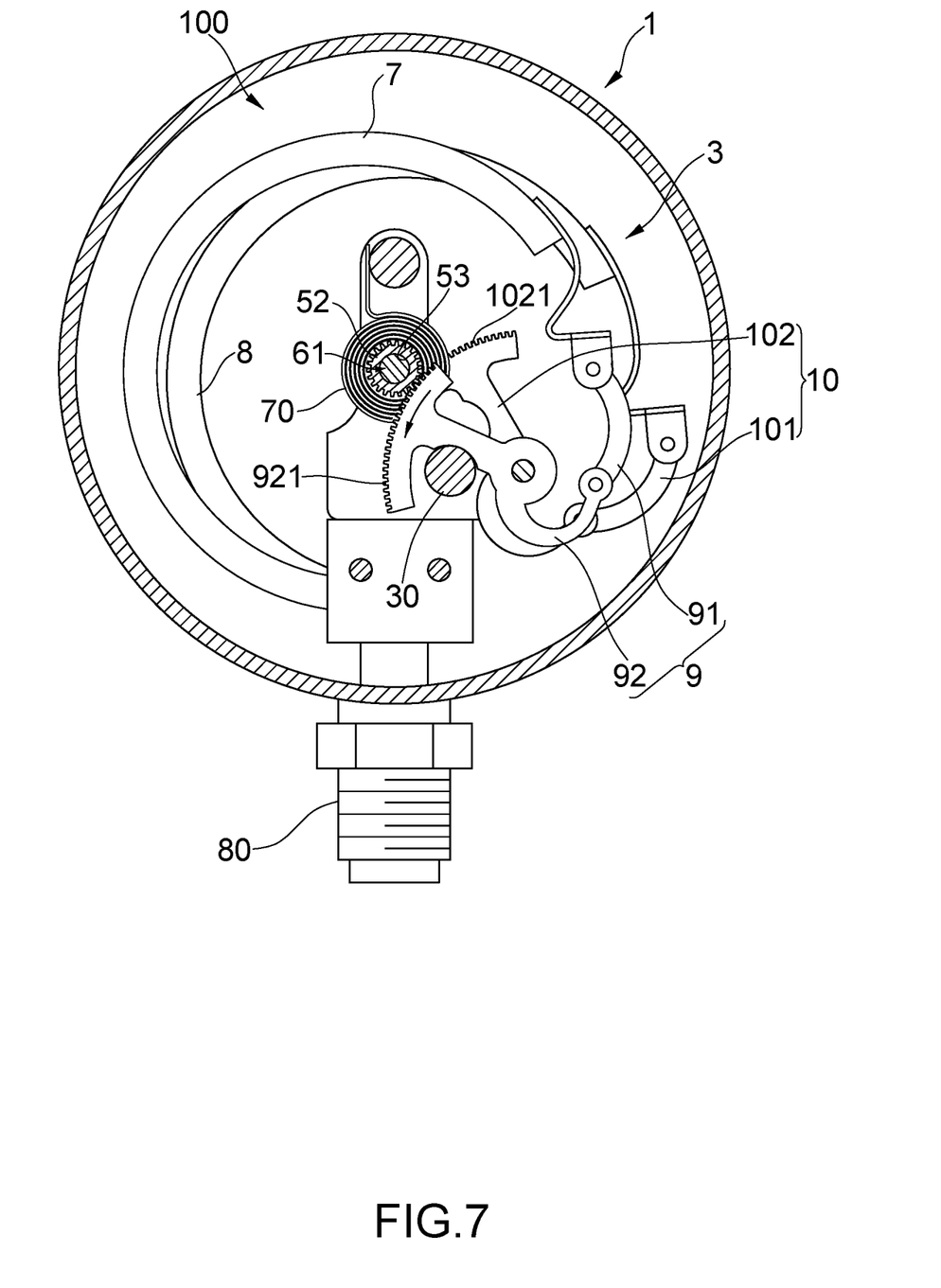
FIG. 7 shows that the first shank contacts the first stop.
Figure 8:
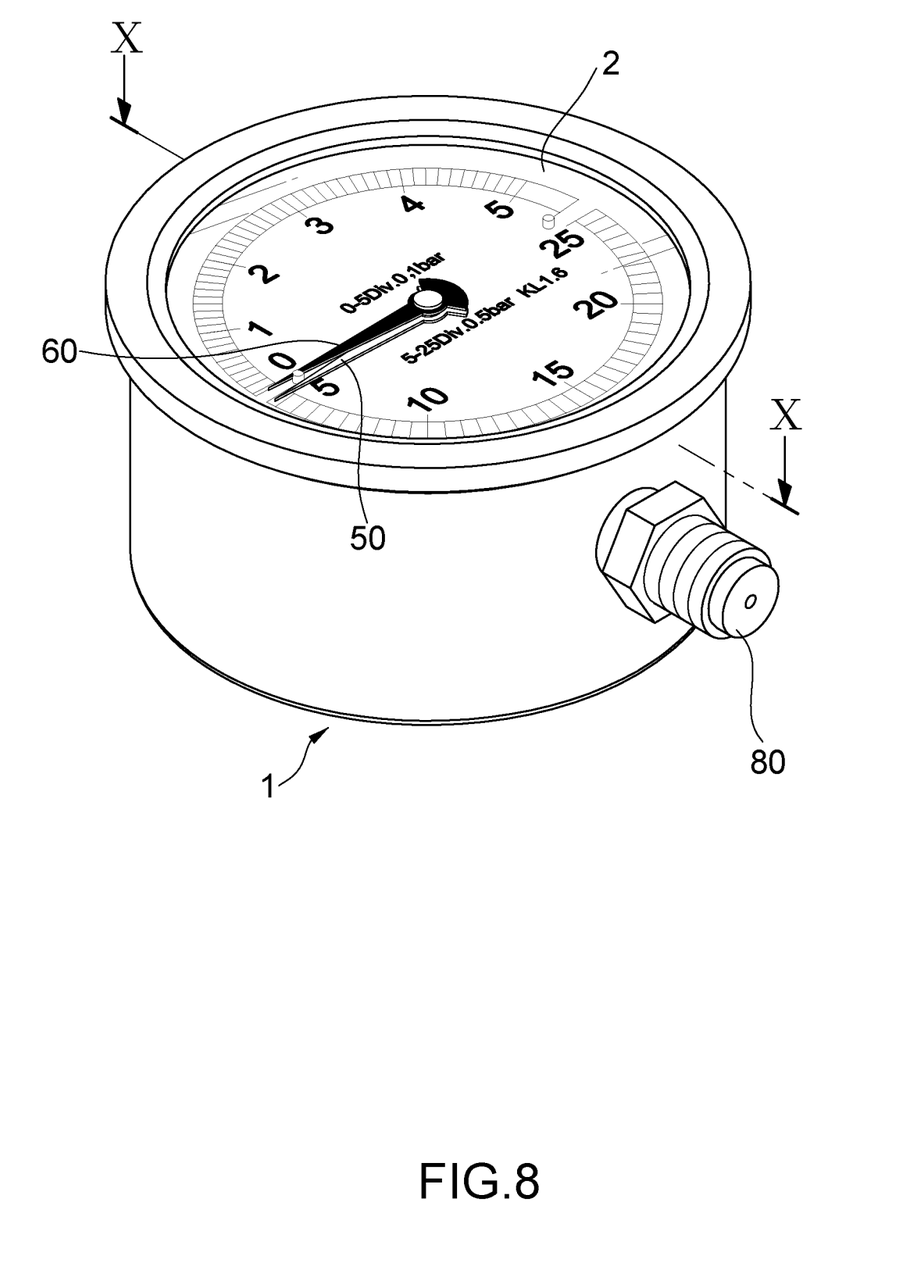
FIG. 8 is a perspective view to show the second embodiment of the pressure gauge of the present invention.

As shown in FIGS. 2, 4 and 7, the chassis plate 4 includes a first stop 30 and a second stop 40. The first stop 30 is located in the first space 41, and the second stop 40 is located in the second space 42. The first transmission unit 9 includes a first link 91 and a first bevel shank 92 which is pivotably connected to the first link 91. The first shank 92 is threadedly engaged with the first gear 52 by the first bevel gear 921. The first link 91 is connected to the first Bourdon Tube 7. The second transmission unit 10 includes a second link 101 and a second shank 102 which is pivotably connected to the second link 101. The second shank 102 is threadedly engaged with the second gear 62 by the second bevel gear 1021. When the first shank 92 contacts the first stop 30, the first shank 92 cannot drive the first pivot unit 5 to spin. When the second shank 102 contacts the second stop 40, the second shank 102 cannot drive the second pivot unit 6 to spin. The existence of the first and second stops 30, 40 prevents the torsion spring 70 from being damaged due to overly rotation of the first and second pivot units 5, 6. It is noted that each of the first and second pivot units 5, 6 has an individual torsion spring. And the first and second Bourdon Tubes 7, 8 are prevented from being damaged by overly deformation.

FIGS. 8 to 12 disclose a second embodiment, wherein the first and second hands 50, 60 move toward two opposite directions when the first and second Bourdon Tubes 7, 8 are activated. The advantages are that the marks of the front section and the rear section are arranged clockwise and counter clockwise, from lower values to higher values, so that the users can easily tell the differences when compared with the first embodiment.

Figure 9:
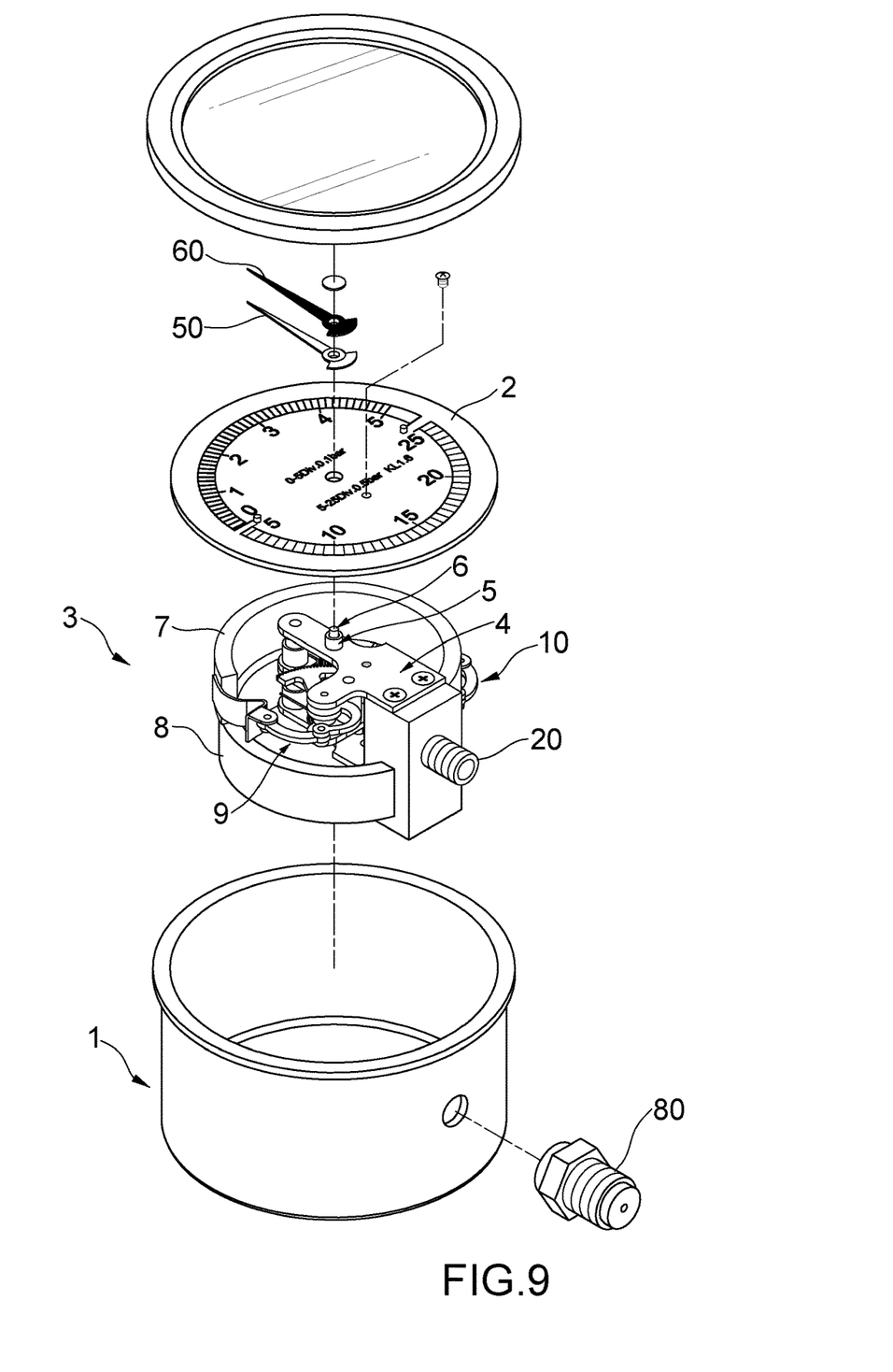
FIG. 9 is an exploded view of the second embodiment of the pressure gauge of the present invention.
Figure 10:
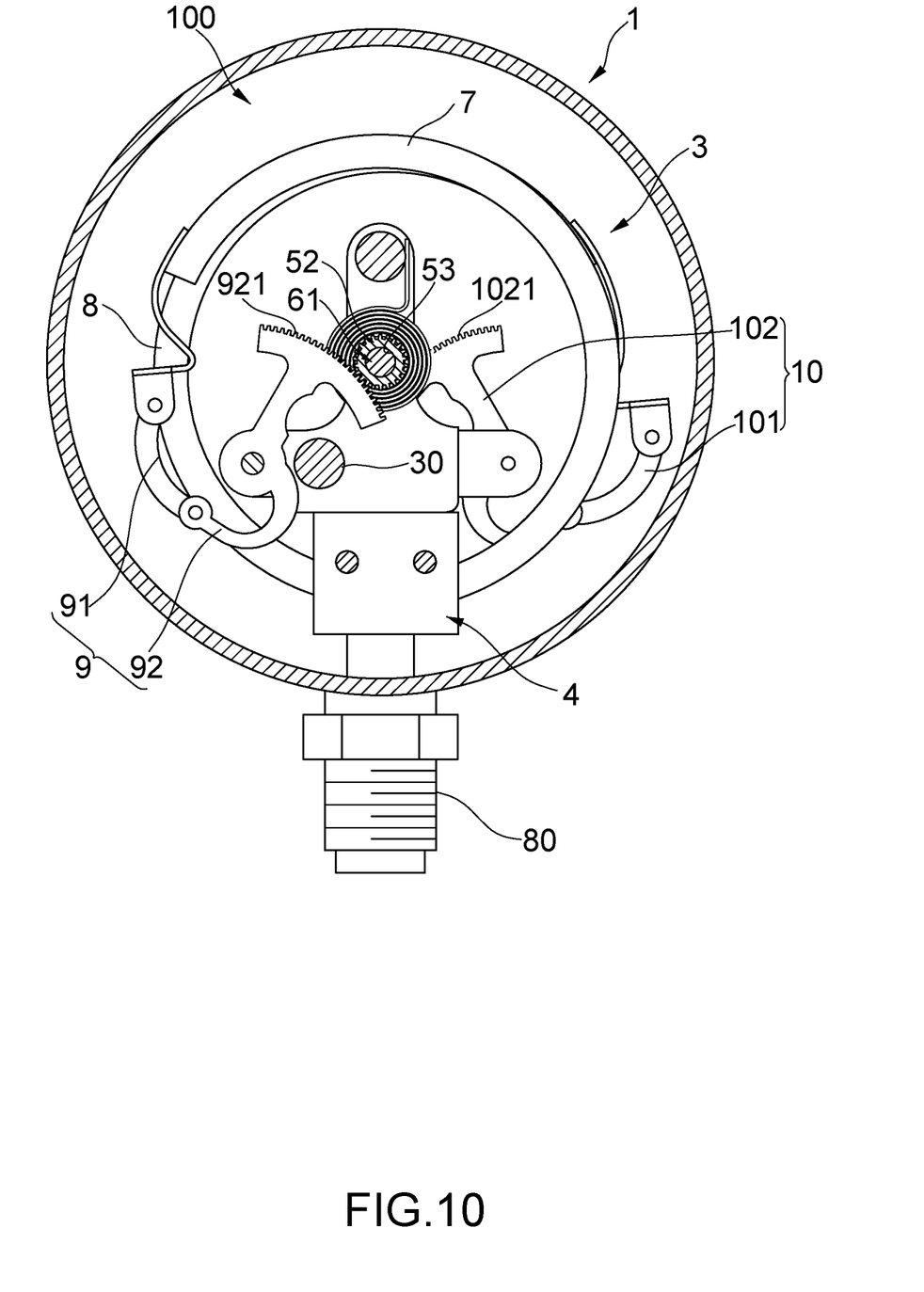
FIG. 10 is a cross sectional view, taken along line X-X in FIG. 8.
Figure 11:
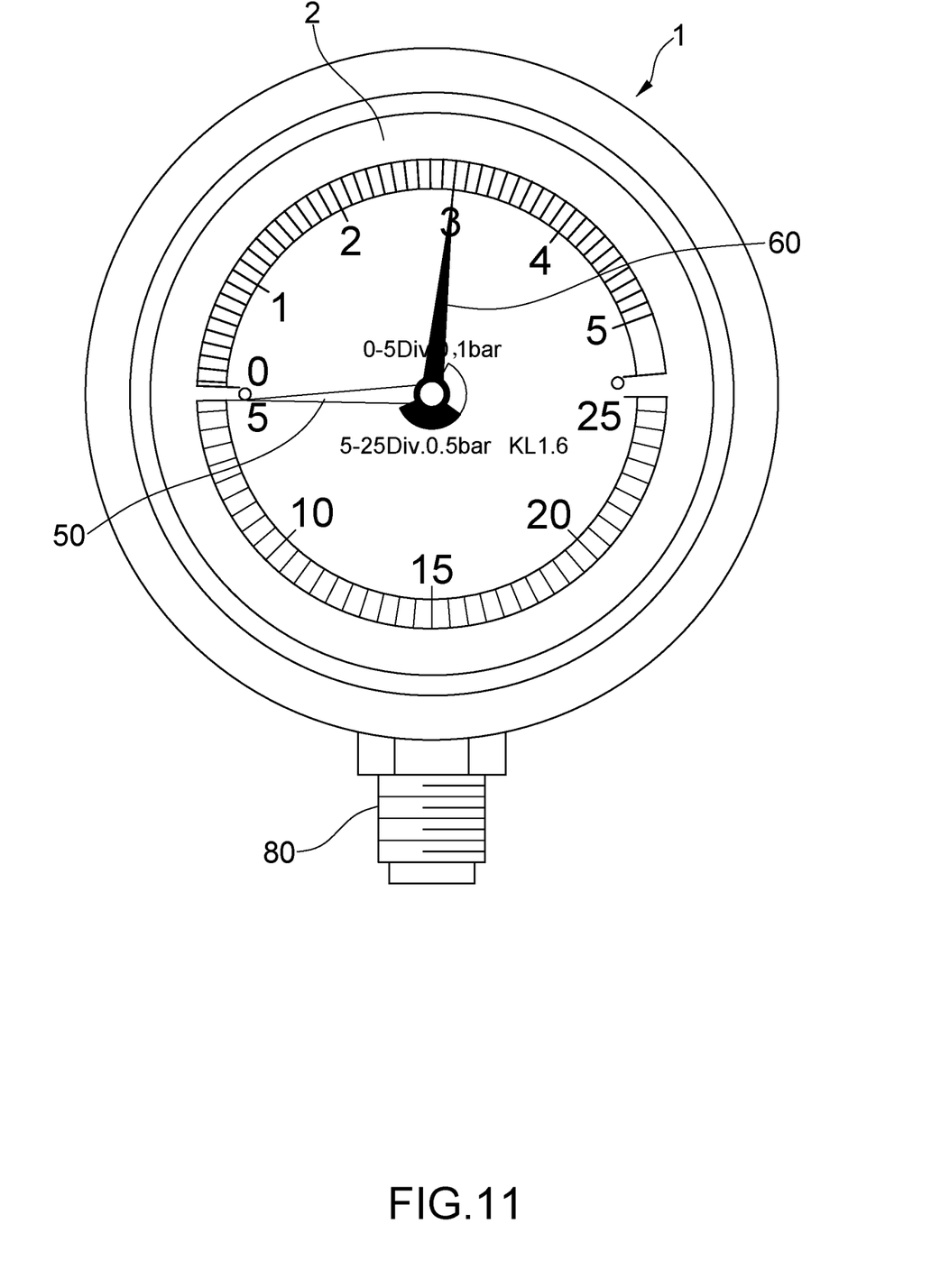
FIG. 11 shows that the second hand of the second embodiment of the pressure gauge of the present invention is moved.
Figure 12:
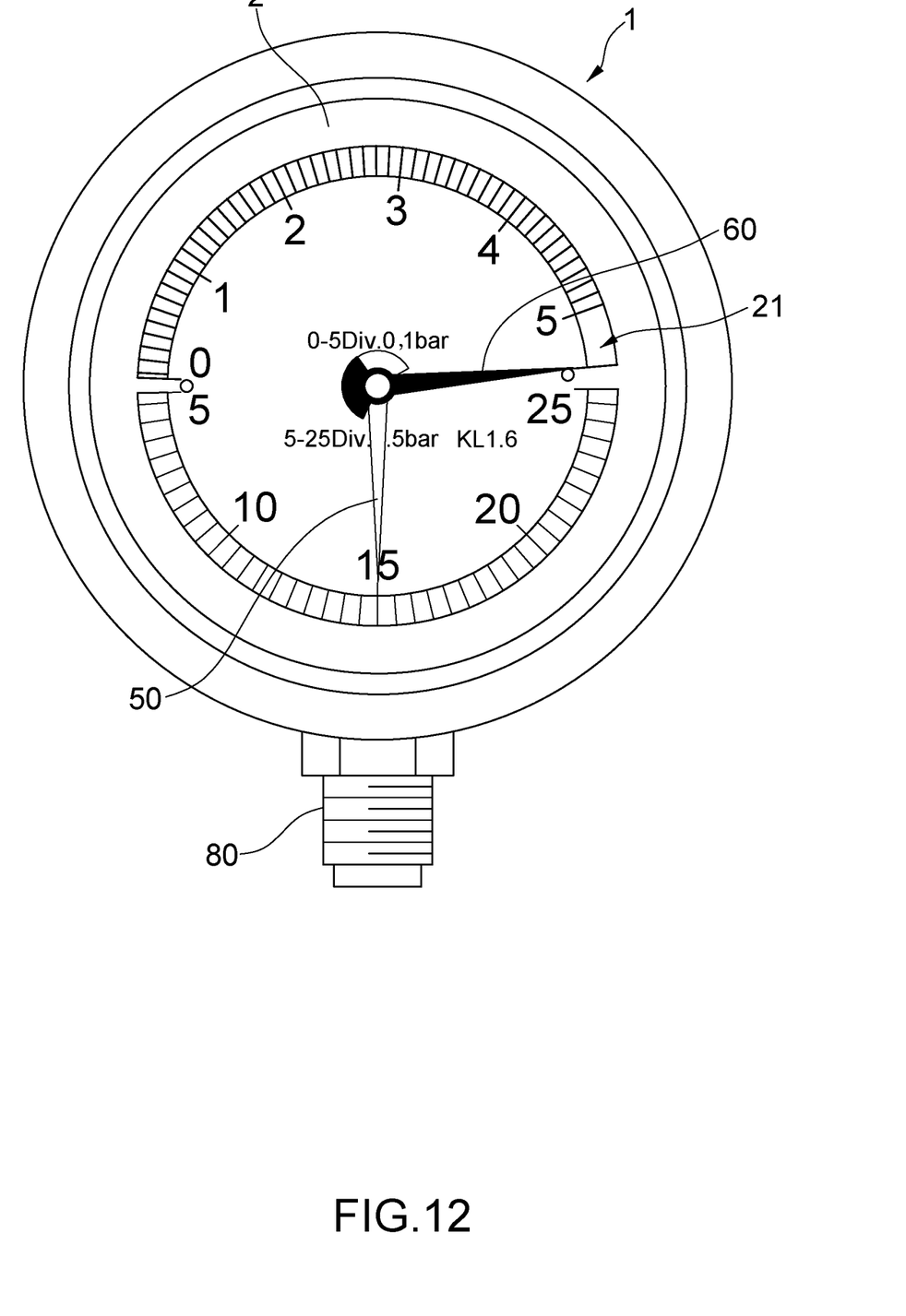
FIG. 12 shows that the first and second hands of the second embodiment of the pressure gauge of the present invention are both moved.

As shown In FIGS. 9 and 10, the first and second Bourdon Tubes 7, 8 are respectively located on two opposite sides of the chassis plate 4. The directions of deformation of the first and second Bourdon Tubes 7, 8 are opposite. The first hand 50 and the second hand 60 move toward two opposite directions.

One of the first and second Bourdon Tubes 7, 8 is made of stainless steel. The stainless steel has high durability and provides the first and second Bourdon Tubes 7, 8 with better recovery ability so as to increase the use life of the pressure gauge of the present invention. In the first embodiment, the pressure range of the first Bourdon Tube 7 is larger than that of the second Bourdon Tube 8. Therefore, the second Bourdon Tube 8 is made of stainless steel is appropriate, because the pressure range for the second Bourdon Tube 8 is 0 to 5 Bar, if the pressure gauge is usually used in a circumstance above 5 Bar, the pressure is too high for the second Bourdon Tube 8 so that the stainless steel prevents the second Bourdon Tube 8 from permanent deformation. If the pressure range of the first Bourdon Tube 7 is smaller than that of the second Bourdon Tube 8. Then, the first Bourdon Tube 7 should be made of stainless steel.

The first and second Bourdon Tubes 7, 8 have different wall thickness. If the pressure range of the first Bourdon Tube 7 is larger than that of the second Bourdon Tube 8. The wall thickness of the first Bourdon Tube 7 should be thicker than that of the second Bourdon Tube 8. If the pressure range of the first Bourdon Tube 7 is smaller than that of the second Bourdon Tube 8. The wall thickness of the first Bourdon Tube 7 can be thinner than that of the second Bourdon Tube 8. The different wall thickness is able to detect different pressure ranges.

While we have shown and described the embodiment in accordance with the present invention, it should be clear to those skilled in the art that further embodiments may be made without departing from the scope of the present invention.

What is claimed is:

1. A pressure gauge comprising:
   a case;
   a dial located in the case, a room formed between the case and the dial;
   a pressure detection unit located in the room and including a chassis plate, the chassis plate including a first pivot unit, a second pivot unit, a first Bourdon Tube, a second Bourdon Tube, a first transmission unit, a second transmission unit and an entrance connected thereto, the first Bourdon Tube connected to the first pivot unit by the first transmission unit, the second Bourdon Tube connected to the second pivot unit by the second transmission unit, the entrance communicating with the first and second Bourdon Tubes, the first and second pivot units partially extending through the dial, and
   a first hand connected to the first pivot unit and located above the dial, a second hand connected to the second pivot unit and located above the dial.

2. The pressure gauge as claimed in claim 1, wherein the chassis plate includes a first space and a second space which is separated from the first space, the first pivot unit includes a first pivot and a first gear which is formed with the first pivot, the first gear is located in the first space, a passage is defined through the first pivot and the first gear, the second pivot unit includes a second pivot and a second gear which is formed with the second pivot, the second gear is located in the second space, the second pivot extends through the passage, the first pivot and the second pivot partially extend through the dial and are exposed beyond the dial, the first transmission unit is threadedly engaged with the first gear, the second transmission unit is threadedly engaged with the second gear.

3. The pressure gauge as claimed in claim 1, wherein the chassis plate includes a first stop and a second stop, the first transmission unit includes a first link and a first bevel shank which is pivotably connected to the first link, the first shank is threadedly engaged with the first pivot unit by the first bevel gear, the first link is connected to the first Bourdon Tube, the second transmission unit includes a second link and a second shank which is pivotably connected to the second link, the second shank is threadedly engaged with the second pivot unit by the second bevel gear, when the first shank contacts the first stop, the first shank cannot drive the first pivot unit to spin, when the second shank contacts the second stop, the second shank cannot drive the second pivot unit to spin.

4. The pressure gauge as claimed in claim 2, wherein the chassis plate includes a first stop and a second stop, the first transmission unit includes a first link and a first bevel shank which is pivotably connected to the first link, the first shank is threadedly engaged with the first gear by the first bevel gear, the first link is connected to the first Bourdon Tube, the second transmission unit includes a second link and a second shank which is pivotably connected to the second link, the second shank is threadedly engaged with the second gear by the second bevel gear, when the first shank contacts the first stop, the first shank cannot drive the first pivot unit to spin, when the second shank contacts the second stop, the second shank cannot drive the second pivot unit to spin.

5. The pressure gauge as claimed in claim 1, wherein the first and second hands move toward two opposite directions when the first and second Bourdon Tubes are activated.

6. The pressure gauge as claimed in claim 1, wherein the first and second Bourdon Tubes are respectively located on two opposite sides of the chassis plate.

7. The pressure gauge as claimed in claim 1, wherein one of the first and second Bourdon Tubes is made of stainless steel.

8. The pressure gauge as claimed in claim 1, wherein the first and second Bourdon Tubes have different wall thickness.

\* \* \* \* \*